United States Patent
Saxena et al.

(10) Patent No.: US 7,836,124 B2
(45) Date of Patent: Nov. 16, 2010

(54) RTP, UDP, IP HEADER COMPRESSION ON THE CIRCUIT SWITCHED TYPE AIRLINK ACCESS

(75) Inventors: Alok K. Saxena, Redmond, WA (US); Donald P. Wahlstrom, Redmond, WA (US); Farooq Bari, Bothell, WA (US)

(73) Assignee: Clearwire Legacy LLC, Kirkland, WA (US)

( * ) Notice: Subject to any disclaimer, the term of this patent is extended or adjusted under 35 U.S.C. 154(b) by 939 days.

(21) Appl. No.: 09/987,955

(22) Filed: Nov. 16, 2001

(65) Prior Publication Data

US 2003/0097476 A1    May 22, 2003

(51) Int. Cl.
*G06F 15/16* (2006.01)
(52) U.S. Cl. .................. 709/204; 709/228; 709/247
(58) Field of Classification Search .......... 709/247, 709/217–218, 232, 228, 204
See application file for complete search history.

(56) References Cited

U.S. PATENT DOCUMENTS

| | | | | |
|---|---|---|---|---|
| 6,229,823 B1* | 5/2001 | Scarmalis | ............... | 370/477 |
| 6,556,587 B1* | 4/2003 | Svanbro et al. | ............... | 370/471 |
| 6,680,921 B1* | 1/2004 | Svanbro et al. | ............... | 370/324 |
| 6,700,888 B1* | 3/2004 | Jonsson et al. | ............... | 370/392 |
| 6,735,186 B1* | 5/2004 | Leppinen | ............... | 370/338 |
| 6,745,012 B1* | 6/2004 | Ton et al. | ............... | 455/67.13 |
| 6,751,209 B1* | 6/2004 | Hamiti et al. | ............... | 370/349 |
| 6,754,231 B1* | 6/2004 | Jonsson et al. | ............... | 370/474 |
| 6,826,176 B1* | 11/2004 | Siddiqui et al. | ............... | 370/352 |
| 6,832,088 B1* | 12/2004 | Stumpert | ............... | 455/445 |
| 6,879,581 B1* | 4/2005 | Leung | ............... | 370/352 |
| 6,879,599 B1* | 4/2005 | Galyas et al. | ............... | 370/466 |
| 2001/0048680 A1* | 12/2001 | Yoshimura et al. | ............... | 370/389 |
| 2002/0064164 A1* | 5/2002 | Barany et al. | ............... | 370/401 |

OTHER PUBLICATIONS

Mei et al., "Turning an HTTP proxy server into a wireless Internet Gateway," 2000, http://www.isoc.org, pp. 1-14.*

* cited by examiner

*Primary Examiner*—John Follansbee
*Assistant Examiner*—Nghi V Tran
(74) *Attorney, Agent, or Firm*—Michael J. Donohue; Davis Wright Tremaine LLP

(57) ABSTRACT

Following initial call establishment negotiation to build a call context between a network and a remote unit, the base processes the header of the data packets. The base acts as an intermediate nodal point to establish call contexts with the endpoints on the traffic channels, wherein the processing of the header of the data packets is terminated at the base. The base processes only the header field that needs to be transmitted along the payload, and transfers the processed portion along with the payload. A session is then established between the remote unit and the network, and the traffic resumes from both ends.

25 Claims, 4 Drawing Sheets

RTP, UDP, IP HEADER COMPRESSION ON THE CIRCUIT SWITCHED TYPE AIRLINK ACCESS

TECHNICAL FIELD

The present invention relates to data communications. More particularly, the invention relates to reducing the bandwidth requirement to transmit data packets.

BACKGROUND OF THE INVENTION

Users may place and receive internet-based calls using voice over Internet protocol (VoIP) via the customer's existing plain old telephone service (POTS) telephone equipment operating in its current fashion. Such a configuration allows a user to utilize existing POTS telephones to place and receive public switched telephone network (PSTN)-based calls as well as VoIP-based calls, thus avoiding the need to purchase redundant telephone hardware equipment.

In placing and receiving a call, data packets are transmitted and received between a network and a remote terminal. In transmitting the data packets, headers may be processed, such as by compression, to reduce the bandwidth requirement to transmit the data packets.

SUMMARY OF THE INVENTION

In accordance with the exemplary embodiments of this invention, narrowband links, such as wireless links, are used in transmitting data packets. In wireless communications, in accordance with various exemplary embodiments, following initial call establishment negotiation to build a call context between a network and a remote unit, the processing of the header of the data packets is terminated at the base. The base then transfers only the associated payload and payload type to the remote unit via the established traffic channel.

In various exemplary embodiments of this invention, in wireless communications, during the initial part of the call establishment, the base intrudes into the call establishment messages to establish a context identification for the remote unit. Following the initial call establishment negotiation, a session is established between the remote unit and the network, and the traffic resumes from both ends.

Based on initial negotiation, the base uses various header fields to associate the identified context with the call as established during the initial negotiation phase. In accordance with various exemplary embodiments, only the header field that needs to be transmitted along with a payload is compressed and transmitted with the payload.

In accordance with various exemplary embodiments, in wireless communications, the base acts as an intermediate nodal point to establish call contexts with the endpoints on the traffic channels, wherein the processing of the header of the data packets is terminated at the base.

DETAILED DESCRIPTION

Figure 1:
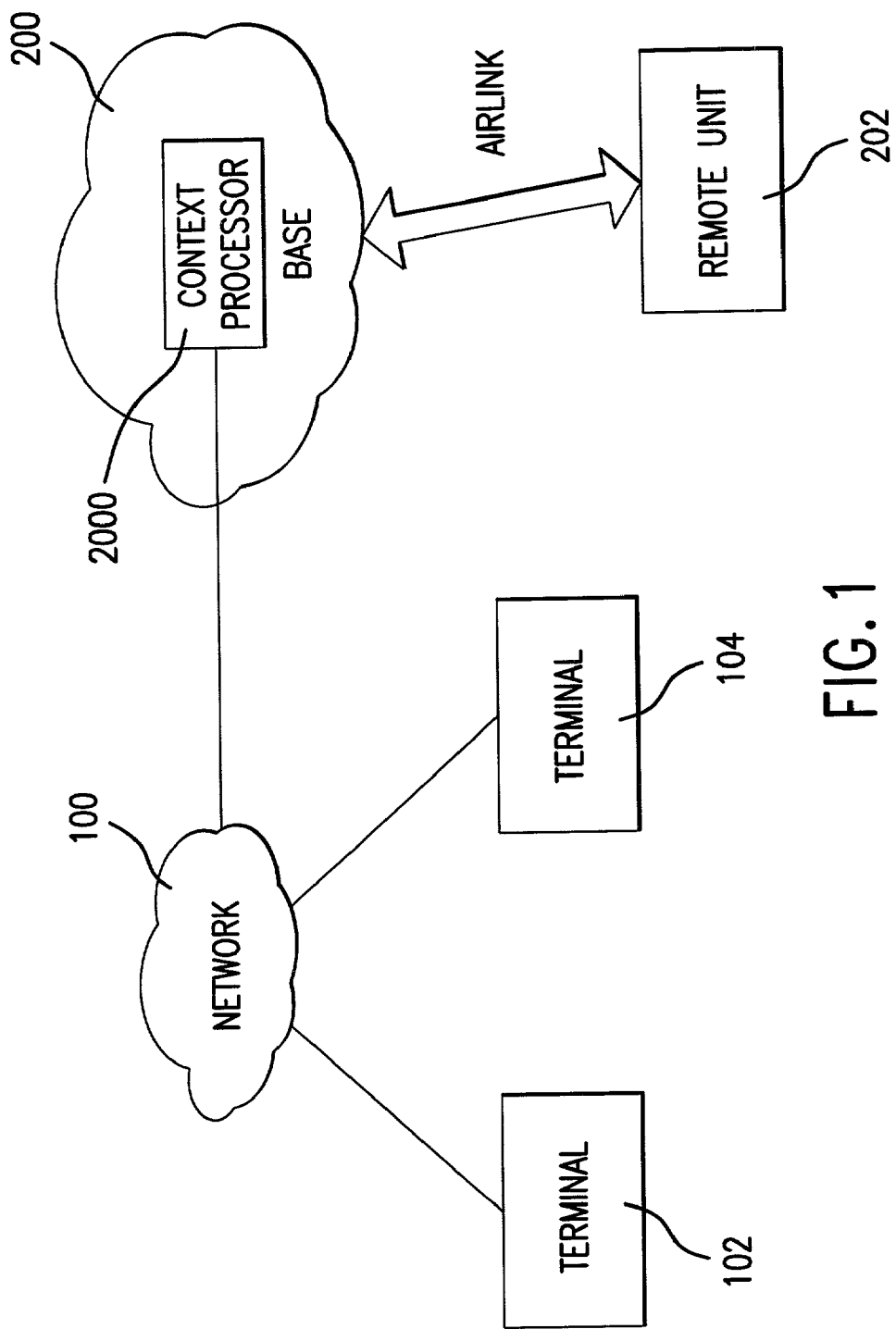
FIG. 1 is an illustration of a packet transmission network.

FIG. 1 is an illustration of a packet transmission network. As shown in FIG. 1, terminals 102 and 104 are connected to a network 100, which in turn is connected to base 200 of remote unit 202. In an exemplary embodiment, terminals 102 and 104 are plain old telephone terminals (POTS), and the network 100 is a public switched telephone network (PSTN). As shown in FIG. 1, the remote unit 202 is connected to the network 100 via a wireless airlink access.

It should be appreciated that this invention is not limited to the packet transmission network as shown in FIG. 1. In accordance with the various exemplary embodiments of this invention, any packet transmission network that provides transmissions via narrowband access may be applied to this invention. That is, it should be appreciated that this invention may be applied to wireline communications as well as wireless communications. Further, though FIG. 1 shows only two terminals 102 and 104, and one remote unit 202, it should be appreciated that any number of terminals and remote units may be applied.

In the exemplary embodiment of FIG. 1, in transmitting a data packet from the network 100 to the remote unit 202 over the airlink access, call establishment is made through initial call establishment between the network gateway of the network 100 and the remote unit 202. Using the initial call establishment negotiation, a call context is established for establishing the call between the network 100 and the remote unit 202. After the call context is built, the data packet is transmitted from the network 100 and the header of the data packet is processed, and relevant portions of the data packet are transferred to the remote unit 202 via the established airlink channel.

In an exemplary embodiment, a media gateway control protocol (MGCP) is used to establish the call context. However, it should be appreciated that any initial call establishment negotiation protocol for establishing a call context may be applied in the exemplary embodiments of this invention.

Figure 2:
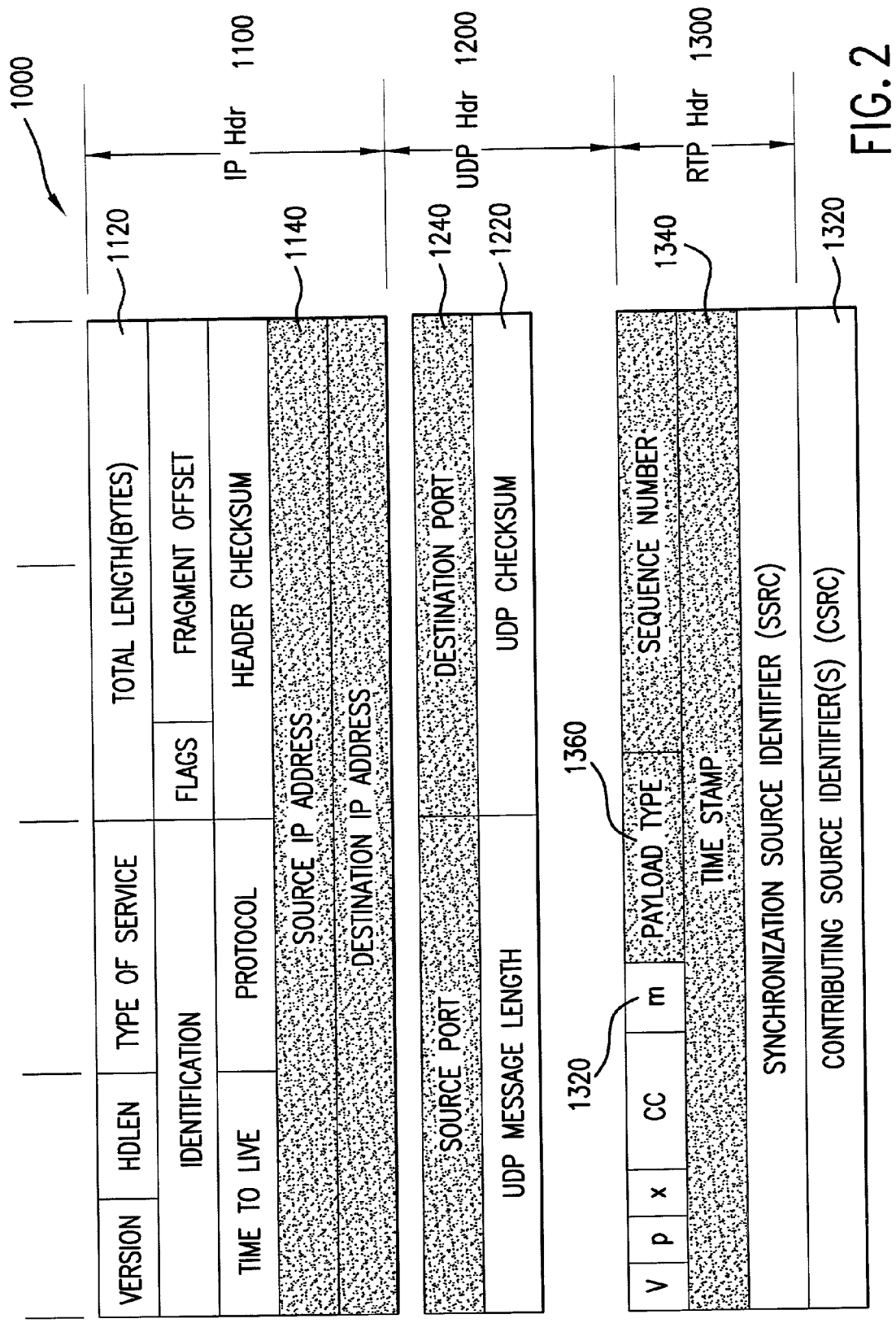
FIG. 2 shows an exemplary header to be processed in accordance with this invention.

FIG. 2 shows an exemplary header to be processed in accordance with this invention, such as an RTP, UDP, IP header for a voice internet protocol (VoIP) data packet. As shown in FIG. 2, an RTP, UDP, IP header 1000 consists of an internet protocol (IP) header portion 1100, a user datagram protocol (UDP) header portion 1200 and a real-time transport protocol (RTP) header portion 1300. IP header portion 1100 includes constant header fields 1120 and context identification associating header fields 1140. UDP header portion 1200 includes constant header fields 1220 and context identification associating header fields 1240. RTP header portion 1300 includes constant header fields 1320, flow regulation header fields 1340, and transmitted header fields 1360.

In accordance with the exemplary embodiments of this invention, the processing of the header of the data packets is terminated at the base 200. As shown in FIG. 1, a context processor 2000 is provided in the base 200 to process the headers 1000 of the data packets. In accordance with various exemplary embodiments of this invention, the context processor 2000 transfers only the transmitted header portions 1360 and the associated data of the data packets to the remote unit 202 via the established traffic channel in a loss-less manner.

Based on initial negotiation, the context processor 2000 can use header fields in the header, such as the source IP address and the destination IP address fields from the context identification associating header fields 1140 of the IP header portion 1100, and the source port and destination port information fields from context identification associating header fields 1240 of the UDP header portion 1200, to associate the destination terminal identification, line identification context with the call as established during the initial call establishment phase.

In particular, in various exemplary embodiments, during the initial part of the call establishment through the call establishment negotiation between the network gateway of the network 100 and the remote unit 202, the context processor 2000 intrudes into the initial call establishment messages at the network 100 to process a create connection message (CRCX) and the associated session data protocol (SDP) header. In these exemplary embodiments, the context processor 2000 extracts the line identification to the remote unit 202 from the SDP header. The context processor 2000 also extracts information such as the source IP address and the destination address from the IP header portion 1100, the source port and destination port information from the UDP header portion 1200. The processor 2040 then processes the extracted information to establish context identification for the remote unit 202.

Following the initial call establishment negotiation, a real-time transport protocol (RTP) session is established between the remote unit 202 and the network gateway of the network 100, and traffic resumes from both the remote unit 202 and the network gateway.

Figure 3:
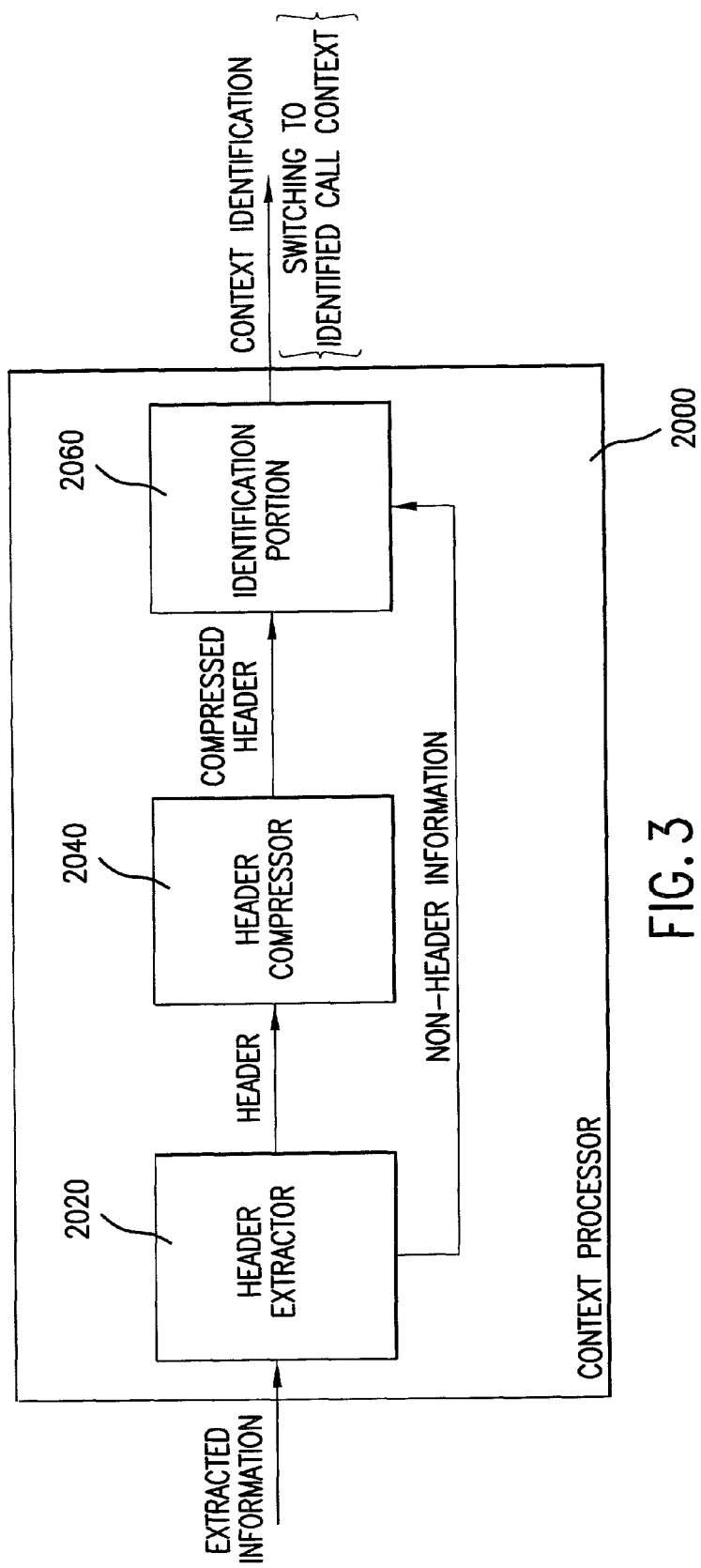
FIG. 3 shows an exemplary embodiment of a context processor in accordance with this invention.

FIG. 3 shows an exemplary embodiment of the context processor of FIG. 1. As shown in FIG. 3, the context processor 2000 includes a header extractor 2020, a header compressor 2040 and an identification module 2060. The header extractor 2020 extracts information from the initial call establishment messages, and separates the header 1000 from the payload. The header compressor 2040 receives the header 1000 from the header extractor 2020, and compresses the relevant portions of the header 1000. The compressed header is then input to the identification module 2060 along with the payload to associate the identified context with the airlink channel of the call established from the initial call establishment messages.

In accordance with the various exemplary embodiments of this invention, only the relevant portions of the header 1000, such as the transmitted header field 1360 of the RTP header portion 1300, are compressed. That is, header fields that remain constant over the life of the connection, such as IP version, IP header length, type of service, IP identification, flags, fragment offset, time to live, protocol type of the constant header fields 1120 in the IP header portion 1100, and the RTP version, padding, extension, CSRC count bits of the constant header fields 1320 in the RTP header portion 1300, are not required by the remote unit 202 for channel processing. Further, the constant header fields 1220 of the UDP header portion 1200, such as UDP Checksum, are not used in channel processing in the embodiments of this invention.

The flow regulation header fields 1340 of the RTP header portion 1300, such as the RTP sequence number field and RTP timestamp field, are used in the base 200 for flow regulation and synchronization and jitter calculation, and are not required to be transmitted over the airlink for channel processing. Similarly, the context identification associating header fields 1140 and 1240 of the IP header portion 1100 and the UDP header portion 1200, respectively, are used to associate the context identification with the established call, and are not required to be transmitted over the airlink for channel processing.

Accordingly, by compressing and transmitting only the relevant fields of the header 1000 that is required to be transmitted along with the payload, such as the payload type field in the transmitted header field 1360 of the RTP header portion 1300, a significant degree of compression may be obtained.

Thus, the bandwidth requirement to transmit the data packet over the airlink access may be limited, and the transmission may be performed in a loss-less manner.

Figure 4:
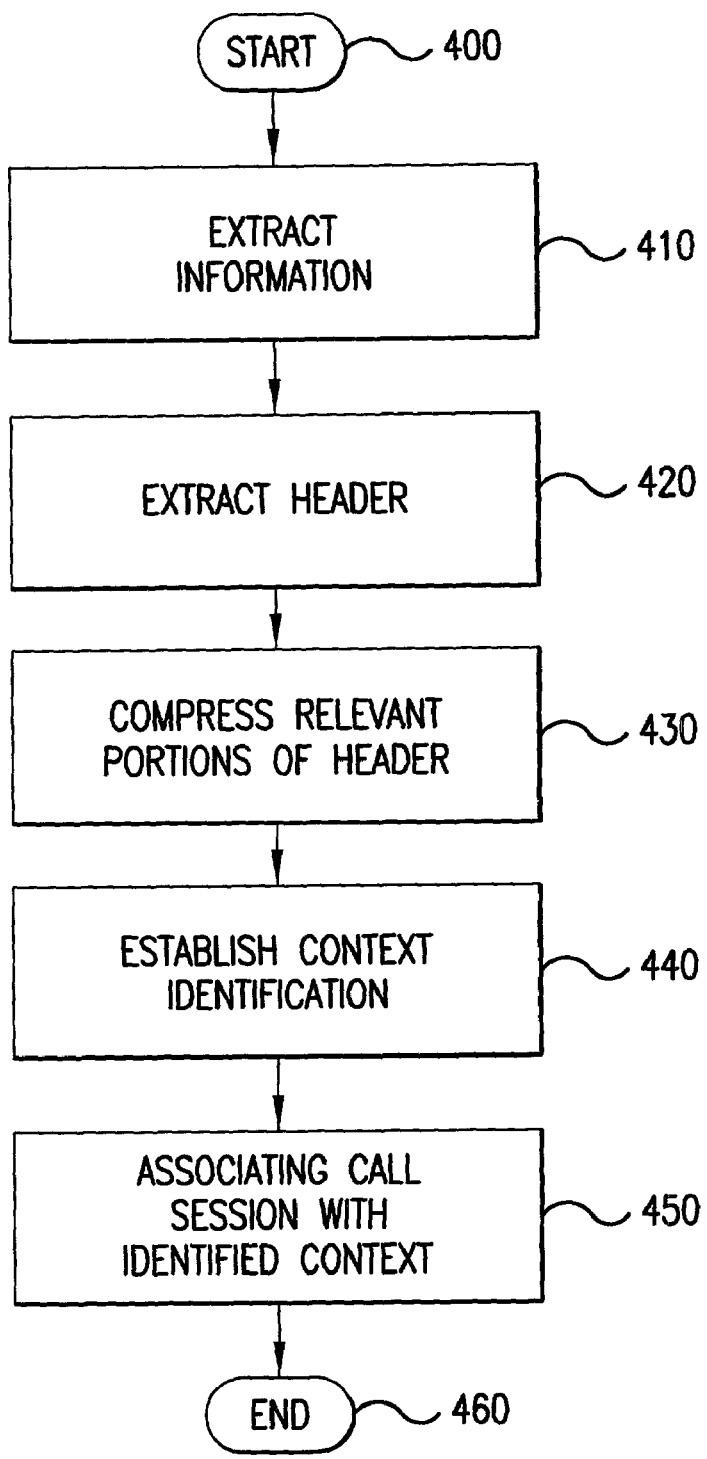
FIG. 4 is a flowchart illustrating a call context establishing process in accordance with this invention.

FIG. 4 is a flowchart illustrating a call context establishment process in accordance with an exemplary embodiment of this invention. As shown in FIG. 4, the process begins with step 400, and continues to step 410, where the information is extracted by the base. That is, in this step, the context processor intrudes into the initial call establishment messages at the network to extract information such as the IP source and destination address, RTP source and destination port information, and line identification information. Control then continues to step 420.

In step 420, header information is extracted from the extracted information. Next, in step 430, relevant portions of the header are compressed. For example, header fields which remain constant or are used for flow regulation and synchronization and jitter calculation, and are not required to be transmitted over the airlink for channel processing, are not compressed. Accordingly, only the relevant fields of the header that are required to be transmitted along with the payload, such as the payload type field, is compressed. Control then continues to step 440.

In step 440 the context identification is formed. Then, in step 450, the call session is established by switching to the identified context. That is, the identified context is associated with the bearer channel of the call session established from the initial call establishment negotiation. Control then continues to step 460, where the process ends.

While the present invention is disclosed in the context of a presently preferred embodiment, it will be recognized that a wide variety of implementations may be employed by persons of ordinary skill in the art consistent with the above discussion and the claims which follow below.

What is claimed is:

1. A call context processor operable in a wireless communication system having a base and a remote unit wherein the call context processor is operable in the base, the call context processor comprising:
   a header extractor configured to extract a header from information extracted from initial call establishment negotiation;
   a header compressor configured to compress only relevant portions of the extracted header, the relevant portions comprising a payload type header field; and
   an identification module configured to establish context identification using the compressed relevant portions of the header wherein the base transfers the associated payload and payload type header portion, less than the entire header, to the remote unit.

2. The call context processor of claim 1, wherein the identification module associates the context identification with a bearer channel of a call established from the initial call establishment negotiation.

3. The call context processor of claim 1, wherein the compressed relevant portion of the extracted header will be transmitted to a remote unit with a payload wherein the header compressor not compressing portions of the header that will not be transmitted to the remote unit with the payload.

4. The call context processor of claim 1, the header being an RTP, UDP, IP header.

5. The call context processor of claim 1, wherein the call context processor extracts information by processing a create connection message and an associated session data protocol header from the initial call establishment negotiation.

6. A transmission network for processing a data packet having a payload and a header, comprising:

a network; and a base connected to the network that includes a call context processor, the call context processor comprising:
- a header extractor configured to extract the header from information extracted from initial call establishment negotiation;
- a header compressor configured to compress only relevant portions of the extracted header, the relevant portions comprising a payload type header field; and
- an identification module configured to establish context identification using the compressed relevant portions of the header wherein the base transfers the payload to a remote unit and does not transfer the entire header to the remote unit.

7. A call context processing method operable between a base and a remote unit, comprising:
- processing a data packet having a payload and a header by extracting the header from information extracted from initial call establishment negotiation;
- compressing only relevant portions of the extracted header, the relevant portions comprising a payload type header field;
- establishing context identification using the compressed relevant portions of the header; and
- transferring the associated payload and not transferring all header fields from the base to the remote unit.

8. The call context processing method of claim 7, further comprising associating the context identification with a channel of a call established from the initial call establishment negotiation.

9. The call context processing method of claim 7, the header being an RTP, UDP, IP header.

10. The call context processing method of claim 7, wherein extracting information from initial call establishment negotiation, and establishing the context identification are performed at the base of a transmission network.

11. The call context processing method of claim 10, wherein a remote unit accesses the base via airlink.

12. The call context processing method of claim 7, wherein extracting information comprises processing a create connection message and an associated session data protocol header from the initial call establishment negotiation.

13. A machine-readable medium having stored thereon a plurality of executable instructions, the plurality of instructions comprising instructions to:
- process a data packet having a payload and a header to thereby extract a header from information extracted from initial call establishment negotiation;
- compress only relevant portions of the extracted header, the relevant portions comprising a payload type header field;
- establish context identification using the compressed relevant portions of the header; and
- transfer the payload and only the compressed relevant portions of the header, less than all header fields, to a remote unit.

14. The machine-readable medium of claim 13, having stored thereon additional executable instructions, the additional instructions comprising instructions to associate the context identification with a channel of a call established from the initial call establishment negotiation.

15. The machine-readable medium of claim 13, the header being an RTP, UDP, IP header.

16. The machine-readable medium of claim 13, wherein extracting information from initial call establishment negotiation, and establishing the context identification are performed at a base of a transmission network.

17. The machine-readable medium of claim 16, wherein a remote unit accesses the base via airlink.

18. The machine-readable medium of claim 13, wherein the instructions to extract information comprises instructions to process a create connection message and an associated session data protocol header from the initial call establishment negotiation.

19. A call processing method for processing a data packet having a payload and a header, comprising:
- extracting the header from information extracted from initial call establishment negotiation;
- combining only relevant portions of the extracted header and the payload, the relevant portions comprising a payload type header field; and
- transmitting only the relevant portions of the extracted header, less than all header fields, and the payload to a remote unit.

20. The method of claim 19, further comprising compressing the relevant portions of the extracted header.

21. The method of claim 20 wherein compressing the relevant portions of the extracted header is performed prior to combining the relevant portions of the extracted header with the payload portion.

22. The method of claim 19, further comprising establishing a call context using the relevant portions of the extracted header.

23. The method of claim 19 wherein the relevant portions of the extracted header are required for transmission of the payload to the remote unit.

24. The method of claim 19 wherein portions of the extracted header not required by the remote unit are not transmitted to the remote unit.

25. A call context processor for processing a data packet having a payload and a header, comprising:
- a header extractor configured to extract the header from information extracted from initial call establishment negotiation;
- a header compressor configured to compress only relevant portions of the extracted header, the relevant portions comprising a source internet protocol (IP) address, a destination IP address, a source port, a destination port, a sequence number, and a time stamp; and
- an identification module configured to establish context identification using the compressed relevant portions of the header wherein the call context processor transfers the payload and only the relevant portions of the header, less than the complete header, to a remote unit.

* * * * *